United States Patent
Garrard et al.

(10) Patent No.: US 8,629,682 B2
(45) Date of Patent: Jan. 14, 2014

(54) RELATING TO DIAGNOSTICS OF A CAPACITIVE SENSOR

(75) Inventors: Mike Garrard, Chelmsford (GB); Ray Marshall, Abbots Langley (GB); Stefano Pietri, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 528 days.

(21) Appl. No.: 12/594,229

(22) PCT Filed: Apr. 6, 2007

(86) PCT No.: PCT/IB2007/051253
§ 371 (c)(1),
(2), (4) Date: Oct. 1, 2009

(87) PCT Pub. No.: WO2008/122842
PCT Pub. Date: Oct. 16, 2008

(65) Prior Publication Data
US 2010/0043531 A1 Feb. 25, 2010

(51) Int. Cl.
*G01R 27/26* (2006.01)

(52) U.S. Cl.
USPC ........... 324/658; 324/686; 324/382; 324/519; 324/750.17; 73/35.01; 73/514.32

(58) Field of Classification Search
USPC .................... 324/382, 519, 750.17, 658, 686; 73/514.32, 35.01–35.14
See application file for complete search history.

(56) References Cited

U.S. PATENT DOCUMENTS

| 3,286,164 A | 11/1966 | De Huff |
| 5,377,524 A | 1/1995 | Wise et al. |
| 5,421,191 A * | 6/1995 | Pyko et al. ................... 73/35.09 |
| 6,466,036 B1 * | 10/2002 | Philipp ........................ 324/678 |
| 6,727,812 B2 | 4/2004 | Sauler et al. |
| 2005/0231212 A1 * | 10/2005 | Moghissi et al. ............. 324/606 |
| 2007/0035312 A1 * | 2/2007 | Hsieh et al. ................... 324/658 |
| 2007/0068266 A1 | 3/2007 | Fujimori et al. |
| 2007/0075710 A1 * | 4/2007 | Hargreaves et al. .......... 324/658 |

FOREIGN PATENT DOCUMENTS

| EP | 0615119 A | 9/1994 |
| EP | 0704706 A1 | 4/1996 |
| EP | 0720007 A1 | 7/1996 |
| JP | 58011824 A | 1/1983 |

OTHER PUBLICATIONS

International Search Report and Written Opinion correlating to PCT/IB2007/051253 dated Mar. 20, 2008.

* cited by examiner

*Primary Examiner* — Arleen M Vazquez
*Assistant Examiner* — Son Le

(57) ABSTRACT

A detector circuit for detecting the presence of a remote capacitive sensor having at least two terminals connected via a protection circuit that includes one or more capacitors, the detector circuit comprising: a current supply for changing the charge on the sensor and the protection circuit, a detector for measuring the voltage on one or more of the terminals; wherein the presence of the sensor is determined by changing the charge on the capacitive sensor and the one or more capacitors of the protection circuit in a predetermined manner such that the voltage measurement on the one or more terminals when the sensor is present is significantly different than when the sensor is absent.

20 Claims, 5 Drawing Sheets

RELATING TO DIAGNOSTICS OF A CAPACITIVE SENSOR

FIELD OF THE INVENTION

This invention relates to improvements in or relating to diagnostics of a capacitive sensor, for example a knock sensor in an engine control system.

BACKGROUND OF THE INVENTION

Abnormal combustion, more commonly known as knock, is a limiting factor on power generation in an internal combustion engine. The name knock refers to the noise that is transmitted from the collision of multiple flame fronts and the increased cylinder pressure that causes the pistons, connecting rods and bearings to resonate. A knock sensor detects engine knock and sends the voltage signal to an engine control unit (ECU). The ECU uses the knock sensor signal to control timing of the engine. Engine knock generally occurs within a specific frequency range and the knock sensor is located on the engine block, cylinder head or intake manifold and is able to detect that frequency range.

Detecting the presence of a capacitive sensor, such as the knock sensor, at the end of a capacitive cable, through an engine control unit (ECU) that is protected by an electromagnetic compatibility (EMC) capacitor is a long existing problem. This is because the knock sensor has high impedance and does not generate a very strong output signal, which means that the sensitivity of the ECU is critical. In addition, due to legislation relating to emission controls in engines there is a legal requirement to know if the knock sensor is working or not. Knock is a relatively quiet noise which can be easily confused with other engine noises and the determination of whether the knock sensor is working or not is made particularly difficult by this. Another problem that exists is that the capacitance of the knock sensor is relatively low and is often hard to measure due to the values of the EMC capacitor and the capacitance in the cabling.

A number of different methods have been proposed to overcome the problem of detecting the presence of the capacitive sensor. One relates to diagnostics using threshold detection as is described in for example EP 0720007 (Bosch). In this method the normal output of the sensor is characterised with respect to engine speed, and output higher or lower than expected is taken to indicate a fault with the knock sensor. The issue with this is that the point of the knock detection system is to minimise knock, which therefore means the normal condition is nascent or no knock and hence low output from the sensor. Since the ECU input is high impedance it tends to be subject to significant pickup of electrical noise. Thus low noise from a connector sensor and electrical pickup by the wires when the sensor is disconnected can be indistinguishable.

A second method of overcoming the problem that has been disclosed is a diagnostic using self resonance as is described in U.S. Pat. No. 5,421,191 a (Chrysler). In this method the sensor is excited with pulses matching the sensor's predetermined resonance and the amplitude of these is measured after excitation is removed. This method requires knowledge of the resonant frequency of the sensor, wiring and load combination as installed, which can vary considerably. If the driving frequency is wrong then no resonance will be induced.

A third method of overcoming the problem that has been disclosed is a diagnostic using capacitor oscillation, as is described in EP 0704706 (Marelli). In this scheme the sensor is used as part of the oscillator. If the sensor is connected then a particular frequency should be presumed. This scheme suffers from tolerance issues. The sensor is around 800 pF and the connector connecting it might be 1 m to 5 m of coaxial cable at 300 pF/m. The EMC protection capacitors are typically between 470 pF and 1000 pF. As these capacitor are usually low tolerance it becomes difficult to identify whether the sensor itself is connected due to the greater amount of low tolerance capacitance in the connection to the sensor.

One object of the present invention is to overcome at least some of the problems associated with the prior art. In addition, a further object is to provide a diagnostic of capacitive sensing by charge sharing.

SUMMARY OF THE INVENTION

The present invention provides a method and an apparatus as described in the accompanying claims.

In order to overcome the problems of the prior art the sensor diagnostics components make use of the same components used for bias. This has the added advantage of minimising the overall number of external components required. This is achieved by sourcing current from the Analogue to Digital Converter (ADC) pin through the network of external components, including the knock sensor. The ratio of connected capacitances results in a ratio of voltages that can be read using the ADC. Connection of the knock sensor is indicated by presence of its capacitance. The manner in which this can be measured is accurate and consistent. The problems associated with the prior art relating to the ability to "see" the knock sensor are overcome by not looking at absolute values but instead looking at relative values.

BRIEF DESCRIPTION OF THE DRAWINGS

Reference will now be made, by way of example to the accompanying drawings, in which.

DETAILED DESCRIPTION OF THE PREFERRED EMBODIMENTS

Figure 1:
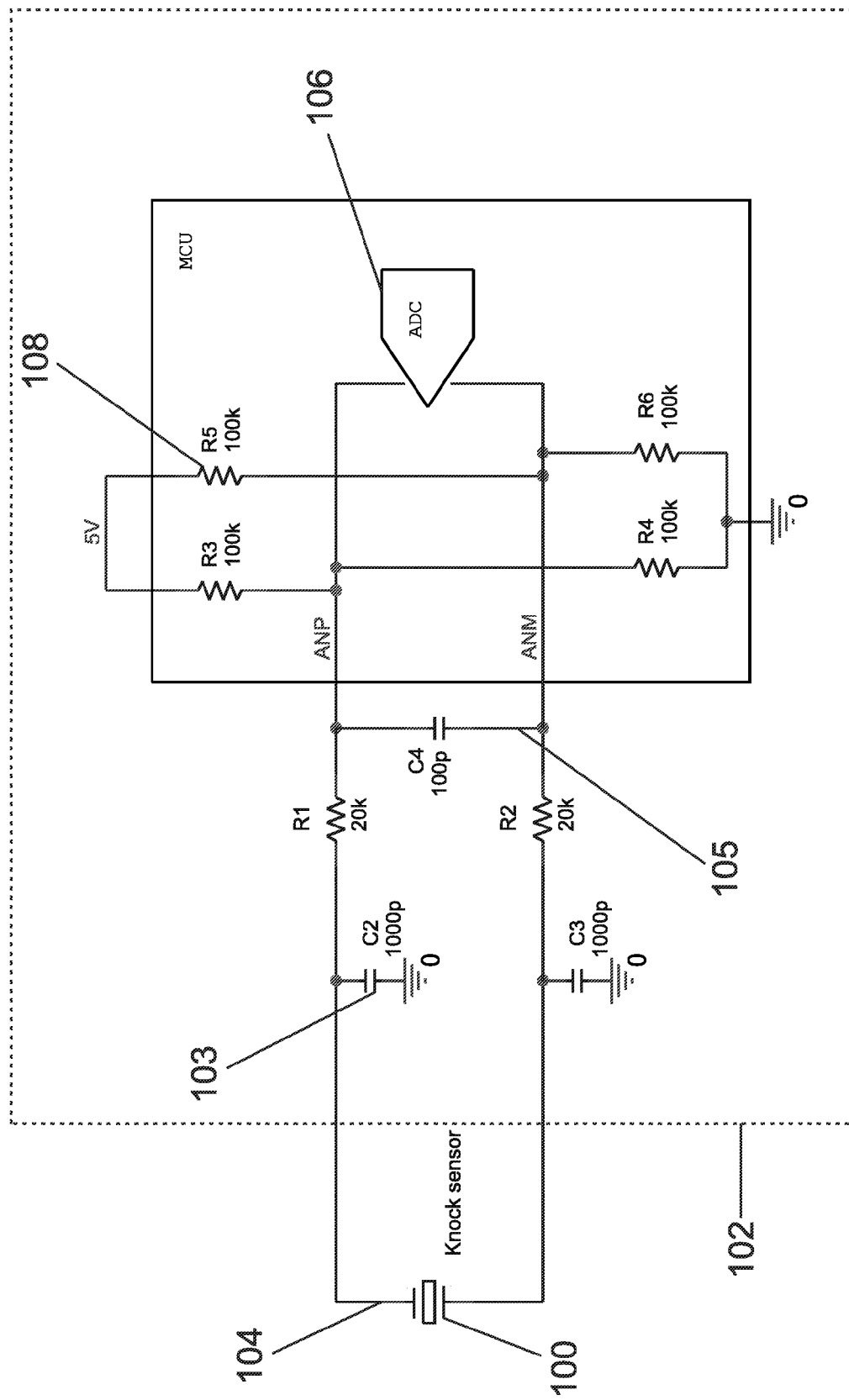
FIG. 1 is a circuit diagram in bias state of the diagnostics circuit for a knock sensor in accordance with one embodiment of the invention, given by way of example.

Referring now to FIG. 1 a knock sensor 100 is shown. In another embodiment, the knock sensor 100 can be a remote capacitive sensor, a pressure sensor, or the like. The knock sensor 100 is generally a piezoelectric element, which electrically tends to have the appearance of a capacitor. The knock sensor is connected to an engine control unit (ECU) 102 through a capacitive cable 104. Typically the knock sensor will have a capacitance of 800 pF and the cable will have a capacitance of the order of 100 pF. The first elements within the engine control unit 102 are two EMC protection capacitors C2 and C3. These capacitors C2 and C3 are each of the order of about 1000 pF. C2 and C3 are protection capacitors for the engine control unit. Two resistors R1 and R2 of about 20 KOhm are connected in series with the capacitors C2 and C3, these resistors limit current and protect an analogue to digital converter ADC 106. Further capacitor C4 is connected in parallel with the knock sensor. This capacitor C4 is of the order of 100 pF and has the effect of the low pass anti-aliasing filter which removes high frequency noise from the signal received from the knock sensor. The circuit includes sensor bias circuitry shown generally as 108, the function of this will be described in greater detail below. The sensor bias circuitry is then connected to the analogue to digital converter (ADC) 106.

In the circuit shown the sensor bias circuitry is designed to bias the ADC 106 at the voltage between 5V and 0V depending on the values of the resistances. In this case because the resistances are all equal the bias voltage on the ADC is 2.5V. This has an advantage in that the ADC does not need to operate at negative voltages and can thus be less complex than would otherwise be the case. The ADC in this case is a differential ADC which enables output measurements from either output pin or a differential measurement from both output pins. The ADC could be replaced by a differential amplifier and an analogue detection circuit if required. This circuit also includes a number of N and P MOSFETs (not shown) which are used in the knock sensor diagnostics and will be described in greater detail below.

In order to determine whether the knock sensor is connected or operating the circuit is first placed in a discharged state. This will be described now with reference to FIG. 2. This is achieved by forcing both pins (ANP and ANM in the figures) to ground (0V). The knock sensor, cable and EMC capacitors are all discharged by ANP and ANM being forced to ground. This grounding is achieved by connecting two MOSFETs 110 and 112 between the pins and ground. In this discharged state the output on the ADC will be zero, this can be measured either singly on each pin or differentially. The manner in which the pins are forced to ground is not limited to the example shown in the diagrams, but may be any other appropriate means.

Figure 2:
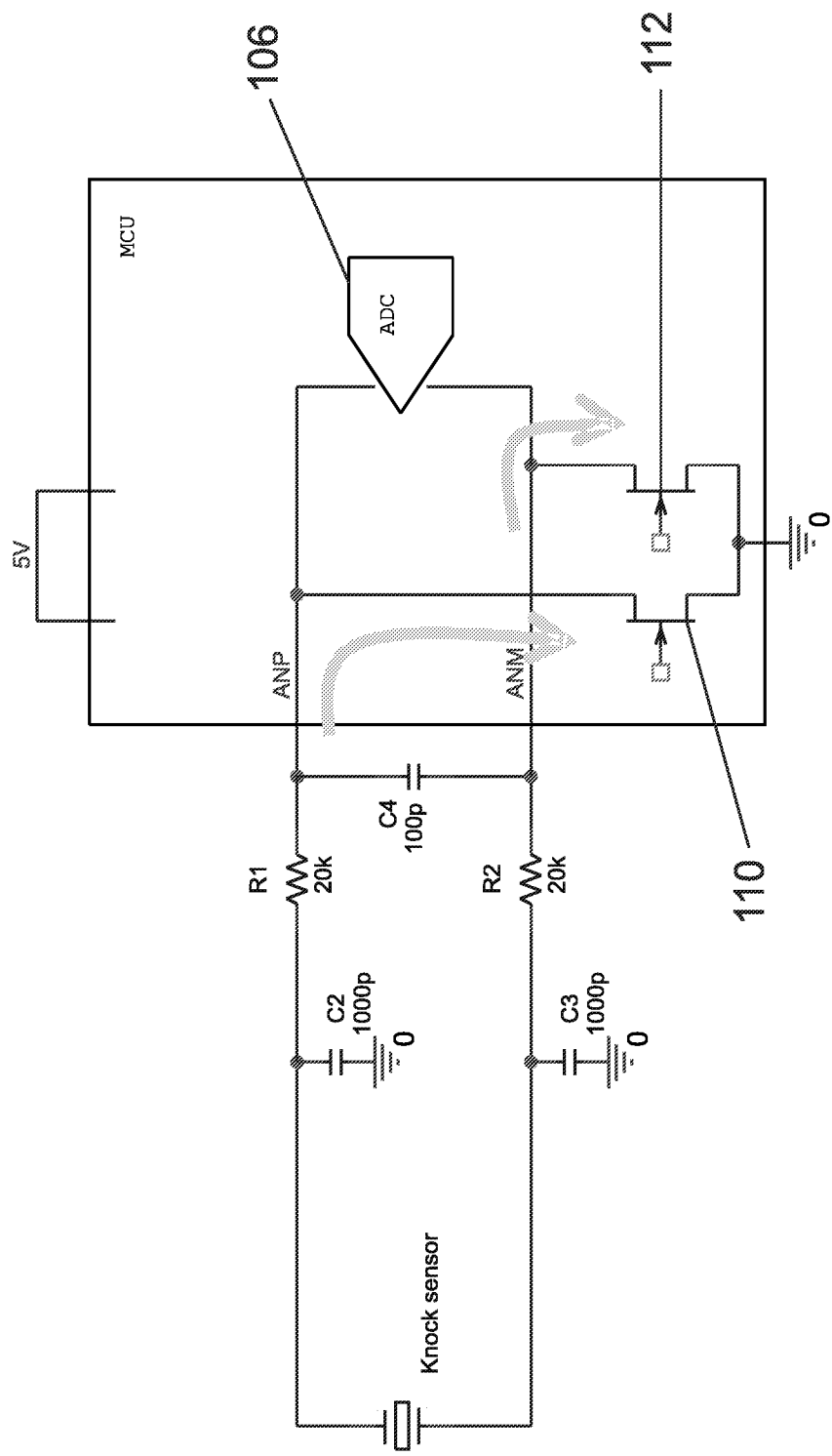
FIG. 2 is a circuit diagram in discharge state of the diagnostics circuit knock sensor in accordance with one embodiment of the invention, given by way of example.

It will be appreciated that the sensor biasing circuitry is included in FIG. 2, although the detail is not shown. In the same way the MOSFETs 110 and 112 are included in FIGS. 1 and 3 even though they are not shown therein.

After having been discharged the diagnosis circuit, the circuit is then pulled up to maximum voltage (5V) on one side. In the diagram this is shown on the ANP side of the circuit but could equally well be on the ANM side of the circuit. Similarly it would be possible to pull up one side of the circuit and then the other in a sequential manner. The ANP side is pulled up by connecting a MOSFET 116 to the 5V supply. This places the circuit in a charge share state and due to the symmetry of the circuit the output pin of the ADC can be read out to determine whether the knock sensor is connected and/or operating.

In this state R1, R2, and C2 have no effect. R1 and R2 cancel out due to the fact that once the circuit is charged up there is no current flowing. As C2 has one side connected to ground and one side connected to 5V the capacitance is irrelevant to the voltage on ANM.

The voltage on C3 is charge shared through the knock sensor and the cable. In terms of capacitance, the capacitance of the knock sensor, cable and capacitor C4 are in parallel with each other. These three capacitances are on the high side of capacitor C3. The values of capacitance for the knock sensor, cable and C4 are substantially similar to the capacitance of C3. This means that once this circuit is stable the voltage on pin ANM of the ADC is going to be approximately 2.5V. The value of capacitance of the knock sensor is significantly greater than that of the cable and C4. Thus, if the knock sensor is not there or faulty there will be a difference between the capacitance of the knock sensor, cable and C4 and that of C3. The effect of this is a larger voltage on C4 than on C3, which means a difference output on pin ANM at the ADC. To make the readings of the circuit in this charge shared state the input to the ADC is preferably measured in single ended mode, although differential mode may also be used.

Figure 3:
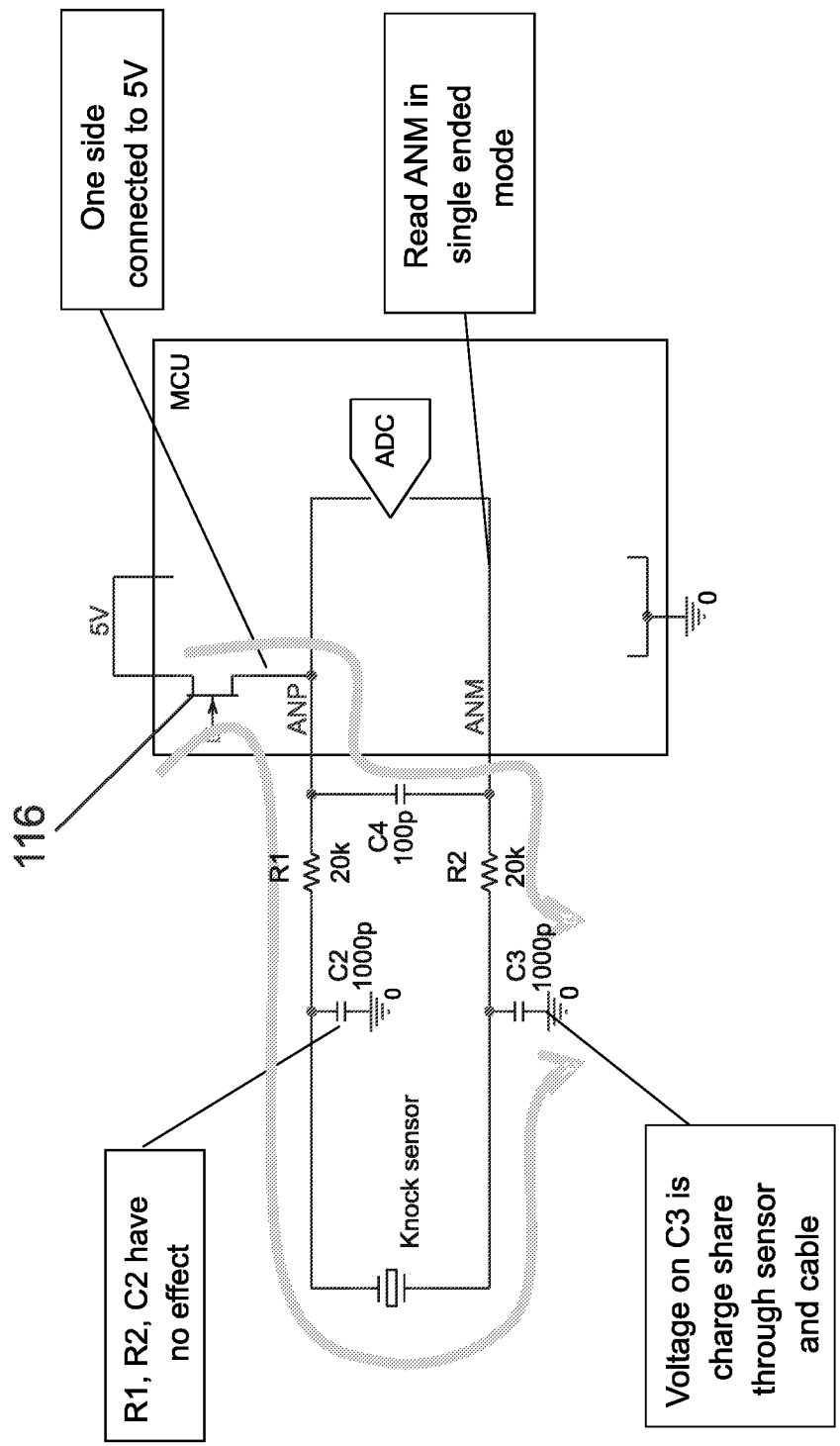
FIG. 3 is a circuit diagram in charge share state of the diagnostics circuit for a knock sensor in accordance with one embodiment of the invention, given by way of example.
Figure 4:
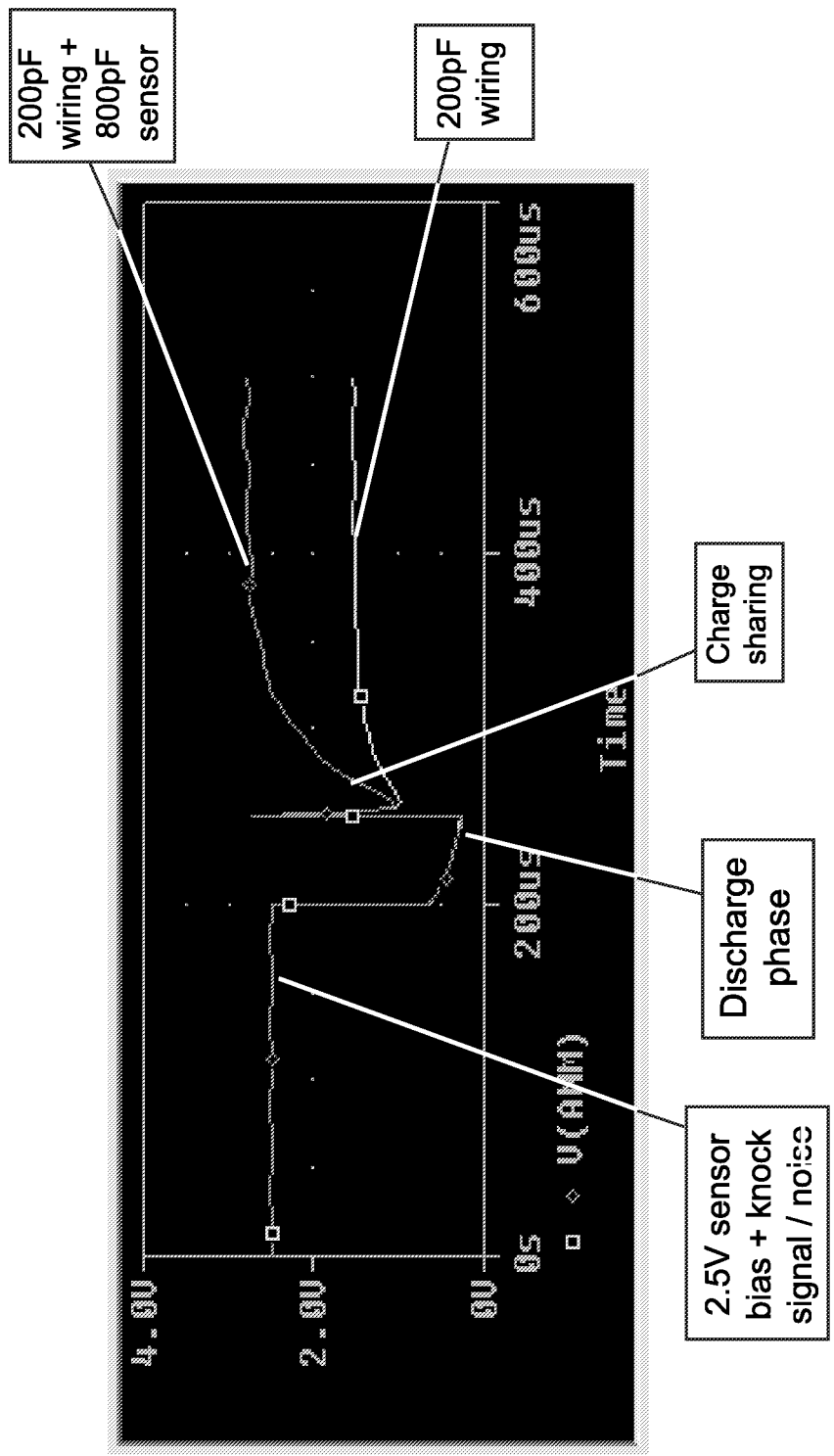
FIG. 4 is a graph of the simulation results comparing the existence of the sensor and no sensor in accordance with one embodiment of the invention, given by way of example.

FIG. 4 shows a graph of voltage against time of the output from the ADC at the different stages illustrated in FIGS. 1, 2 and 3. The graph shows the three stages with the knock sensor working in one example and the knock sensor not working in another. The first stage is the sensor bias with knock signal and noise, this stage lasts between zero seconds and 200 μs in the graph, but on a vehicle would be the normal case for a sensor in use. The voltage is at about 2.5 V throughout this stage as indicated above. The second stage is the discharged phase and last between 200 μs and 250 μs in this embodiment. At this point the voltage goes down towards zero. The third and final stage is the charge sharing phase this lasts from about 250 μs to 500 μs. In the graph shown there are two distinct lines, one at the voltage of about 2.5 V and the other at a lower voltage of approximately 1.8 V. The difference in the voltage measurements are sufficiently significant to be measured on the ADC output pin. The output at 2.5 V is that achieved when the knock sensor is working and the overall capacitance of the wiring and sensor is of the order of 1000 pF. The lower voltage output is achieved when the knock sensor is not working or not connected in this case the overall capacitance is of the order of 200 pF.

This invention has a significant advantage over the prior art, in that it provides a definitive means of determining whether the knock sensor is connected or not. The difference in voltage on the output pin of the ADC is easily measurable as can be seen in FIG. 4. As the difference in voltage is at a reasonably substantial level it is not necessary to use expensive, sensitive equipment to measure the different voltages on the output pin.

Figure 5:
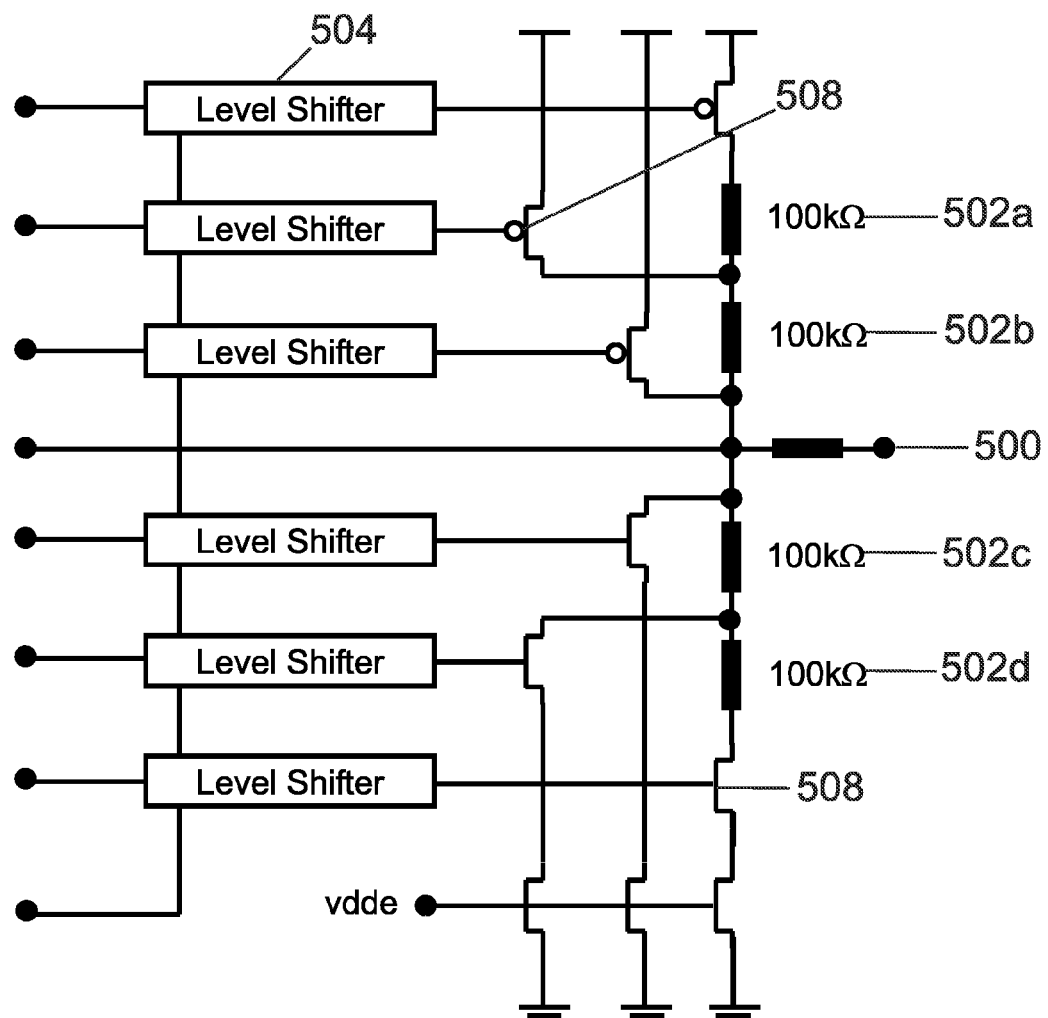
FIG. 5 is example of a pin pull resistor configuration in accordance with one embodiment of the invention, given by way of example.

As has been previously mentioned the knock sensor diagnostics circuit includes a number of MOSFETs which are required at various stages in the process. To provide a high degree of adjustability a pin pull resistor configuration as is shown in FIG. 5 may be used. The configuration includes an input pin through which the knock sensor signal is received 500; a number of resistors 502 a, b, c and d; number of level shifters 504; and a plurality of MOSFETs 508. The MOSFETs include certain n-type MOSFETs and certain p-type MOSFETs. This circuit shows a number of resistors and switches although not all are required to run the diagnostic. They are included to make the knock sensor diagnostics circuit adjustable in terms of different knock sensors in different engines. The manner in which the resistors and MOSFETs are connected is controlled through the level shifters from the digital logic of the engine control unit and is adjusted according to the engine and knock sensor requirements.

It will be appreciated that the example shown is merely an example and many variations of the circuit may exist which fall within the scope of this invention. For example, different values of capacitance, resistance or circuit design can be used. It is a common feature of them all that the resulting voltage on the ECU pins is substantially and measurably different when the knock sensor is there than when it is not.

The invention claimed is:
1. A detector circuit for detecting a presence of a remote capacitive sensor having two terminals connected via a pro- tection circuit that includes one or more capacitors to the detector circuit, the detector circuit comprising;

a voltage supply to provide a first voltage to the remote capacitive sensor, when present, and the protection circuit;

bias circuitry coupled to the voltage supply, the bias circuitry having first and second terminals each configured to be connected to a respective one of the two terminals of the remote capacitive sensor, wherein the two terminals of the remote capacitive sensor are both isolated from being connected directly to ground, the bias circuitry to couple the first and second terminals to the ground to discharge the bias circuitry during a first time period, and to disconnect the first and second terminals from being coupled to the ground and provide the first voltage from the voltage supply to the first terminal during a second time period; and a detector having a first input terminal coupled to the first terminal of the bias circuitry, and a second input terminal coupled to the second terminal of the bias circuitry, the detector to measure a voltage variation between the first and second terminals of the bias circuitry during the second time period, and to determine whether the remote capacitive sensor is present based on the voltage variation;

wherein the first voltage causes a current to be sourced from the detector through the bias circuitry and the remote capacitive sensor; and wherein the voltage variation being larger than a threshold voltage is indicative of the remote capacitive sensor being present.

2. A detector circuit according to claim 1, further comprising at least one of a current source and a current sink as a current supply.

3. A detector circuit according to claim 2, wherein the charge is changed by sinking or sourcing current into one of the terminals of the remote capacitive sensor.

4. A detector circuit according to claim 2, wherein sourcing current into the remote capacitive sensor is achieved by pulling one of the two terminals of the remote capacitive sensor, when present, to a predetermined voltage.

5. A detector circuit according to claim 2, wherein sourcing current into the remote capacitive sensor is affected by a capacitor.

6. A detector circuit according to claim 1, further comprising a switch to switch the load on one or both of the first and second terminals of the bias circuitry to an impedance level having a predetermined value to allow the detection of the voltage variation.

7. A detector circuit according to claim 1, wherein one of the terminals of the remote capacitive sensor, when present, is connected to ground.

8. A detector circuit according to claim 1, wherein the detector is an Analogue to Digital Converter (ADC).

9. A detector circuit according to claim 1, wherein the detector circuit is a single silicon device.

10. A detector circuit according to claim 1, further comprising:

one or more switches to change a state of the detector circuit such that the remote capacitive sensor, when present, and interface components can be charged or discharged.

11. A detector circuit according to claim 1, wherein the remote capacitive sensor is a knock sensor in an engine control system.

12. A detector circuit according to claim 1, wherein the remote capacitive sensor is a pressure sensor in an engine control system.

13. An electronic control unit for an engine including a detector circuit according to claim 1.

14. A method for detecting a presence of a remote capacitive sensor having two terminals connected via a protection circuit that includes one or more capacitors, the method comprising:

forcing, during a first time period, first and second terminals of bias circuitry to ground, wherein each of the first and second terminals is configured to be connected to a respective one of the two terminals of the remote capacitive sensor, wherein the two terminals of the remote capacitive sensor are both isolated from being connected directly to ground;

discharging the bias circuitry in response forcing to the first and second terminals to the ground;

disconnecting, during a second time period, both of the first and second terminals from being coupled to the ground;

providing, during the second time period, a voltage from a voltage source to the first terminal;

sourcing, during the second time period, a current from a detector through the bias circuitry and the remote capacitive sensor;

measuring, during a second time period, a voltage variation between the first and second terminals of the bias circuitry based on the voltage provided to the first terminal; and determining whether the remote capacitive is present based on the voltage variation between the first and second terminals;

wherein the voltage variation being larger than a threshold voltage is indicative of the remote capacitive sensor being present.

15. The method claim 14, further comprising:

sourcing of current into the sensor by pulling one of the two terminals of the remote capacitive sensor, when present, to a predetermined voltage.

16. The method claim 15, wherein the sourcing of current into the one of the two terminals of the remote capacitive sensor, when present, is affected by a capacitor.

17. The method claim 14, further comprising:

switching a load on one or both of the two terminals of the remote capacitive sensor to an impedance level having a predetermined value to allow the detection of the voltage variation.

18. The method claim 14, wherein one of the two terminals of the remote capacitive sensor, when present, is connected to the ground.

19. The method claim 14, further comprising:

changing, via one or more switches, a state of the detector circuit such that the remote capacitive sensor, when present, and interface components can be charged or discharged.

20. A method comprising:

during a first time period:

closing a first switch to couple a first terminal of bias circuitry to ground;

closing a second switch to couple a second terminal of the bias circuitry to the ground; and discharging the bias circuitry in response to closing the first and second switches, wherein each of the first and second terminals is configured to be connected to a respective one of the two terminals of the remote capacitive sensor, wherein the two terminals of the remote capacitive sensor are both isolated from being connected directly to ground; and during a second time period:
opening the first switch to disconnect the first terminal of the bias circuitry from being coupled to ground;
opening the second switch to disconnect the second terminal of the bias circuitry from being coupled to the ground;
providing a voltage to the first terminal of the bias circuitry;
sourcing a current from a detector through the bias circuitry and the remote capacitive sensor;
measuring a voltage variation between the first and second terminal of the bias circuitry based on the voltage provided to the first terminal of the bias circuitry; and
determining whether the remote capacitive sensor is present based on the voltage variation between the first and second terminals of the bias circuitry, wherein the voltage variation being larger than a threshold voltage is indicative of the remote capacitive sensor being present.

* * * * *